United States Patent Office 2,827,320
Patented Mar. 18, 1958

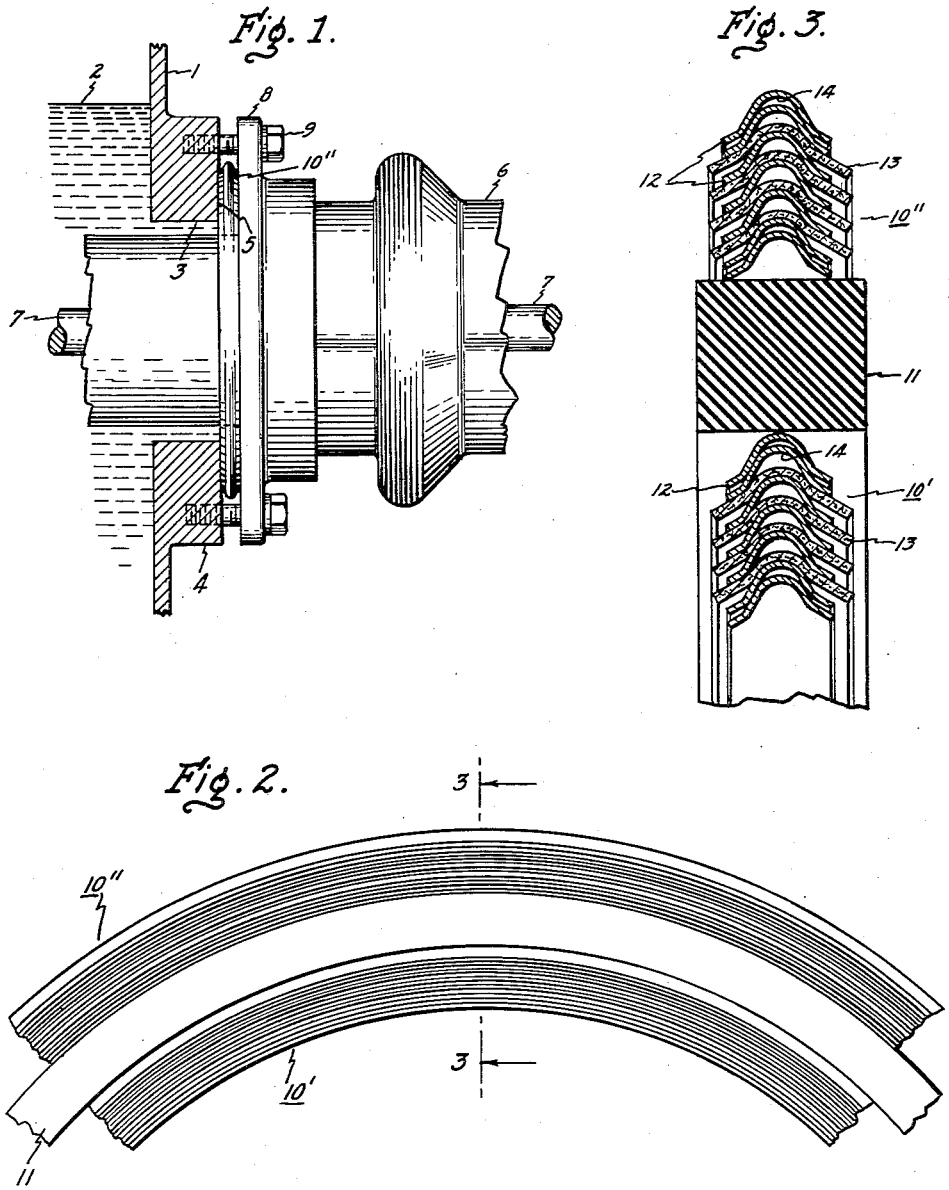

2,827,320

SEAL

Elias K. Kane, Pittsfield, Mass., assignor to General Electric Company, a corporation of New York Application November 30, 1955, Serial No. 550,007

1 Claim. (Cl. 288—20)

This invention relates to a seal, and more particularly, to a liquid tight seal between two adjacent surfaces. The invention is particularly illustrated in its applicability to a seal between the tank wall of an electrical apparatus and the mounting flange of a terminal bushing which is mounted on said tank wall and extends through an aperture formed in said tank wall. However, the invention is not necessarily restricted thereto since it is believed to have a much wider range of use.

There is presently on the market a gasket which comprises a continuous resilient metallic ribbon which has at least one lengthwise extending generally U or V shaped fold formed therein and which is simultaneously spirally wound with a non-metallic filler tape. Such a gasket has been compressed between the apertured tank side wall of an oil filled electrical apparatus and the mounting flange of the terminal bushing of said apparatus to seal the joint therebetween. For such a gasket to be effective as a liquid tight seal the opposite surfaces of the apertured tank side wall and terminal bushing mounting flange must be highly smooth and parallel. Otherwise, the gasket will not be evenly compressed and oil will leak at the joint. Obtaining smooth and parallel opposite surfaces at the joint is not easily accomplished and increases assembly and production costs.

Accordingly, it is an object of this invention to provide a low cost and easily assembled seal between two adjacent surfaces.

It is a further object of this invention to provide a low cost and easily assembled seal between the apertured tank wall of an electrical apparatus and the mounting flange of a terminal bushing.

In my invention two narrow gaskets of the heretofore mentioned type are disposed inside and outside of a wider elastic gasket, such as a rubber gasket, to provide a low cost and easily assembled seal which does not require the high degree of smoothness and parallelism heretofore required at the opposite surfaces of the sealed joint.

My invention will be better understood from the following description taken in connection with the accompanying drawing and its scope will be pointed out in the appended claim.

In the drawing, Fig. 1 is a partly broken away side elevation view of one form of my invention. Fig. 2 is a partly broken away enlarged front view of the seal of Fig. 1. Fig. 3 is a section view of said seal taken on the line 3—3 of Fig. 2. Like reference numerals will be used throughout the various figures to indicate like parts.

Referring now particularly to Fig. 1 of the drawing, shown therein is the apertured side wall 1 of a main tank which is filled with an electrical insulating liquid such as oil 2 in which an electrical apparatus such as a transformer may be immersed. About the aperture 3 of wall 1 and on the outside of wall 1 is formed a boss 4 having an outer flat surface 5. Extending through aperture 3 is a terminal bushing 6 for a terminal lead 7. Terminal bushing 6 may be made from electrical insulation such as porcelain and has an annular flat mounting flange 8 thereon which may be an integral part of bushing 6 or may be a metallic part which is connected to the bushings 6 by such methods as soldering or brazing. Positioned between the surface 5 and the opposite face of flange 8 is a seal which is compressed between surface 5 and the opposite face of flange 8 by a plurality of screws 9 which extend through holes formed in flange 8 and into aligned threaded blind bores formed in boss 4.

As shown in Figs. 2 and 3, the seal comprises three annular gaskets 10', 11 and 10'' which are concentrically disposed with respect to each other. The central gasket 11 is made from an elastic non-metallic material such as rubber. By elastic is meant a material which is easily deformed and quick in recovering to its original shape after the forces deforming same have been removed. The other two gaskets 10' and 10'' are disposed inside and outside respectively of the gasket 11 and closely adjacent thereto. Gaskets 10' and 10'' per se are not part of my invention and may be constructed in the manner disclosed in Hubbard et al. Patent 1,942,703, issued January 9, 1934. Broadly, gaskets 10' and 10'' each comprise a continuous resilient metallic ribbon or strip 12 which has at least one lengthwise extending generally U-shaped fold 14 formed therein and which is spirally wound with a non-metallic filler material 13 such as asbestos between adjacent central turns thereof. Filler material 13 may be in the form of a ribbon or tape which is simultaneously spirally wound with metallic ribbon 12. Also, the filler material tape may have a lengthwise fold preformed therein similar to the fold 14, or it may be initially flat but readily deformable so that it will assume its illustrated shape after winding with the strip 12. The filler material 13 does not extend between the first and last few turns of metallic ribbon 12. Instead these first and last several turns are wound upon each other to form reinforcing rings or bands for the central turns which have the filler material 13 therebetween. The various turns are kept from springing apart by fastening each of the opposite ends of metallic ribbon 12 to its immediately adjacent metallic turn by methods such as brazing or welding.

In Fig. 3 the parts 10', 11, and 10'' are shown in their uncompressed state. The filler tape 13 is slightly wider than the metallic ribbon 12 and extends beyond the side edges thereof, but the side edges of filler tape 13 may be flush with the side edges of metallic ribbon 12 although the former arrangement is slightly more effective as a sealing means than the latter arrangement. In any event, in my invention the central gasket 11 is made wider than the two gaskets 10' and 10'' and from an elastic non-metallic material such as natural or synthetic rubber.

The fold 14 is continuous and gives the cross section of ribbon 12 a roughly U shaped configuration. However, the fold 14 need not necessarily be U shaped, but can have other shapes as a V shape. The principle of operation of gaskets 10' and 10'' is that when they are compressed the U shaped configuration will be pinched, but if the sealed joint relaxes the pinched U shaped configuration will expand to take up the slack in the joint. The first and last several turns of ribbon 12 which constitute reinforcing rings for the central turns provide radial backing for the central turns to ensure that the gaskets 10' and 10'' are not radially overstressed.

Experience has shown that gaskets 10' and 10'' alone do not provide a reliable liquid tight seal between the surface 5 and the opposite surface of flange 8 unless such surfaces are smoothed and have a high degree of parallelism. An oil leak in an electrical apparatus is a serious matter since contamination of the oil by the atmosphere will result in decreasing the insulating strength of the oil. Additionally, a small leak can result in a considerable loss of oil since many electrical apparatuses are not installed with the intent that they be inspected regularly at close intervals. However, it is to be understood that my invention is not limited to making joints oil tight, but that the electrical insulating medium 2 could be any other insulating liquid or even an insulating gas.

In my invention since the gasket 11 is elastic and wider than the gaskets 10' and 10" the necessity for the high degree of smoothness and parallelism heretofore required at the opposite joint faces when just gaskets 10' and 10" or similar types alone were used is dispensed with. For this reason the seal between members 4 and 8 is lower cost and more easily assembled than the prior art seal.

Inasmuch as the gasket 11 is wider than gaskets 10' and 10" when the screws 9 are tightened the gasket 11 will be compressed before the gaskets 10' and 10". Since the rubber gasket 11 is very easily deformed as compared to gaskets 10' and 10" the rubber gasket 11 will effectively seal the opposite surfaces of boss 4 and flange 8 even though there is not a high degree of smoothness and parallelism at said opposite surfaces. After the width of gasket 11 is reduced to the width of gaskets 10' and 10" tightening of the bolts 9 is continued to also compress the gaskets 10' and 10" since they serve two functions. One function is to act as inner and outer reinforcing rings for the central gasket 11 so that it will not collapse radially due to the high compressive forces imposed thereon, and for this reason gasket 11 preferably fits snugly about and within gaskets 10' and 10" respectively and is in contact therewith. The other function of gaskets 10' and 10" is to act as inner and outer seals for the central rubber gasket 11. Natural rubber and many synthetic rubbers are corroded by insulating oils. Accordingly, the inner gasket 10' ensures that at least excessive quantities of oil 2 do not come in contact with rubber gasket 11. It will be appreciated that in some cases a trace of oil may get to rubber gasket 11 but in other cases absolutely no oil will get around gasket 10' to gasket 11.

The outer gasket 10" protects the rubber gasket 11 from deterioration by sunlight, rain, dirt and the like. In some electrical apparatus such as network transformers the right-hand outside end of terminal bushing 6 is immersed in insulating oil by mounting an oil filled box on side wall 1 over terminal bushing 6. In such a case the outer gasket 10" like the inner gasket 10' protects rubber gasket 11 from excessive quantities of oil.

Since in my invention the central gasket 11 is intended to operate as a liquid tight seal it must be constructed from an elastic material such as rubber, as contrasted to soft metals or the like which can be deformed by compression but will not assume their original shape when the compressive forces are relieved. If the central gasket 11 is elastic it will be able to expand and take up any slack or lossness in the sealed joint. However, if the central gasket is not elastic it will be unable to expand to take up any slack or lossness, in which event the liquid tightness of the joint is dependent solely on the gaskets 10' and 10". Gaskets 10' and 10" are resilient due to their resilient metallic ribbon 12 but are more dependent than gasket 11 for their effectiveness as liquid tight seals on highly smooth and parallel joint surfaces.

While there has been shown and described a particular embodiment of the invention, it will be obvious to those skilled in the art that changes and modifications may be made without departing from the invention, and therefore it is intended by the appended claim to cover all such changes and modifications as fall within the true spirit and scope of the invention.

What I claim as new and desire to secure by Letters Patent of the United States is:

A seal comprising three annular closely concentric and contacting gaskets disposed within an identical plane, the central one of said gaskets being constructed from elastic rubber and having a greater width measured in an axially parallel direction than the other two of said gaskets and extending beyond each of the opposite sides of each of said two other gaskets, said other two gaskets comprising a lengthwise folded resilient spirally wound metallic strip having non-metallic filler material between adjacent turns thereof.

References Cited in the file of this patent

UNITED STATES PATENTS

| | | |
|---|---|---|
| 2,191,044 | Seligman | Feb. 20, 1940 |
| 2,196,953 | Bohmer et al. | Apr. 9, 1940 |
| 2,249,127 | Goetze | July 15, 1941 |
| 2,442,312 | Price | May 25, 1948 |

FOREIGN PATENTS

| | | |
|---|---|---|
| 4,864 | Great Britain | Mar. 2, 1903 |